United States Patent
Renaudin et al.

(10) Patent No.: US 9,604,554 B2
(45) Date of Patent: Mar. 28, 2017

(54) CHILD CAR SEAT WITH HEIGHT-ADJUSTABLE SEAT CUSHION

(71) Applicant: DOREL JUVENILE GROUP, INC., Foxboro, MA (US)

(72) Inventors: Francois Renaudin, Cholet (FR); Nicolas Garnier, Saint Germain sur Moine (FR); Nicolas Pasquier, Cholet (FR); David M. Amirault, Indianapolis, IN (US); Ward A. Fritz, Westwood, MA (US); Walter S. Bezaniuk, Berkley, MA (US); Dana E. Chicca, Swansea, MA (US); Andrew W. Marsden, Hingham, MA (US); Joseph D. Langley, Foxboro, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/399,102

(22) PCT Filed: Oct. 7, 2013

(86) PCT No.: PCT/EP2013/070859
§ 371 (c)(1),
(2) Date: Nov. 5, 2014

(87) PCT Pub. No.: WO2014/056859
PCT Pub. Date: Apr. 17, 2014

(65) Prior Publication Data
US 2015/0108800 A1   Apr. 23, 2015

(30) Foreign Application Priority Data

Oct. 8, 2012   (FR) ...................................... 12 59576
Apr. 11, 2013   (FR) ...................................... 13 53301

(51) Int. Cl.
*B60N 2/28* (2006.01)
*B60N 2/16* (2006.01)

(52) U.S. Cl.
CPC ............. *B60N 2/2866* (2013.01); *B60N 2/16* (2013.01); *B60N 2/2803* (2013.01);
(Continued)

(58) Field of Classification Search
CPC ...... B60N 2/2875; B60N 2/2803; B60N 2/26; B60N 2/464; B60N 2/2866;
(Continued)

(56) References Cited

U.S. PATENT DOCUMENTS 5,054,853 A * 10/1991 Gillies ................. B60N 2/2806
297/250.1
5,282,666 A * 2/1994 Demick ............... B60N 2/3081
297/237

(Continued)

FOREIGN PATENT DOCUMENTS

EP   1470952 A1   10/2004
FR   2897021 A1   8/2007
(Continued)

OTHER PUBLICATIONS

PCT International Search Report and Written Opinion completed by the ISA/EP on Oct. 29, 2013 and issued in connection with PCT/EP2013/070859.
(Continued)

*Primary Examiner* — Milton Nelson, Jr.
(74) *Attorney, Agent, or Firm* — Barnes & Thornburg LLP

(57) ABSTRACT

A juvenile vehicle seat includes a seat bottom and a seatback. The juvenile vehicle seat also includes a child-restraint harness coupled to the seat bottom and seatback to restrain a juvenile seated on the seat bottom.

17 Claims, 7 Drawing Sheets

(52) U.S. Cl.
CPC ......... *B60N 2/2812* (2013.01); *B60N 2/2851* (2013.01); *B60N 2/2875* (2013.01); *B60N 2/2887* (2013.01); *B60N 2002/2818* (2013.01)

(58) Field of Classification Search
CPC  B60N 2002/2818; B60N 2/2812; B60N 2/16; B60N 2/28; B60N 2/2851; B60N 2/2887; A47D 1/103
USPC ... 297/256.13, 256.11, 256.1, 344.15, 250.1, 297/339, 338, 253, 473, 468
See application file for complete search history.

(56) References Cited

U.S. PATENT DOCUMENTS

| | | | | |
|---|---|---|---|---|
| 5,593,209 | A * | 1/1997 | Bauer | B60N 2/0825 297/344.13 |
| 5,788,326 | A * | 8/1998 | Kawade | B60N 2/2812 248/419 |
| 6,030,047 | A | 2/2000 | Kain | |
| 6,042,182 | A * | 3/2000 | Geis | B60N 2/2821 248/188.4 |
| 6,045,184 | A * | 4/2000 | Nakagawa | B60N 2/2821 297/250.1 |
| 6,053,573 | A * | 4/2000 | Nakagawa | B60N 2/0284 297/237 |
| 6,193,312 | B1 | 2/2001 | Yoshida et al. | |
| 6,464,294 | B1 | 10/2002 | Kain | |
| 6,491,348 | B1 | 12/2002 | Kain | |
| 6,676,213 | B1 | 1/2004 | Dlugos | |
| 6,688,685 | B2 | 2/2004 | Kain | |
| 6,698,841 | B1 | 3/2004 | Glover et al. | |
| 6,808,232 | B2 * | 10/2004 | Takizawa | B60N 2/06 297/256.1 |
| 8,727,439 | B2 * | 5/2014 | Herzberg | B60N 2/28 297/233 |
| 2002/0145318 | A1 * | 10/2002 | Asbach | B60N 2/2812 297/250.1 |
| 2005/0099046 | A1 * | 5/2005 | Barth | B60N 2/2806 297/250.1 |
| 2009/0256404 | A1 | 10/2009 | Strong et al. | |
| 2011/0062756 | A1 * | 3/2011 | Campbell | B60N 2/2812 297/250.1 |

FOREIGN PATENT DOCUMENTS

| | | | |
|---|---|---|---|
| JP | 04342621 A * | 11/1992 | |
| WO | 2007127710 A2 | 11/2007 | |
| WO | WO 2013016310 A1 * | 1/2013 | ........... B60R 22/024 |

OTHER PUBLICATIONS

PCT International Search Report and Written Opinion completed by the ISA/EP on Oct. 24, 2012 and issued in connection with PCT/EP2012/069891.

* cited by examiner

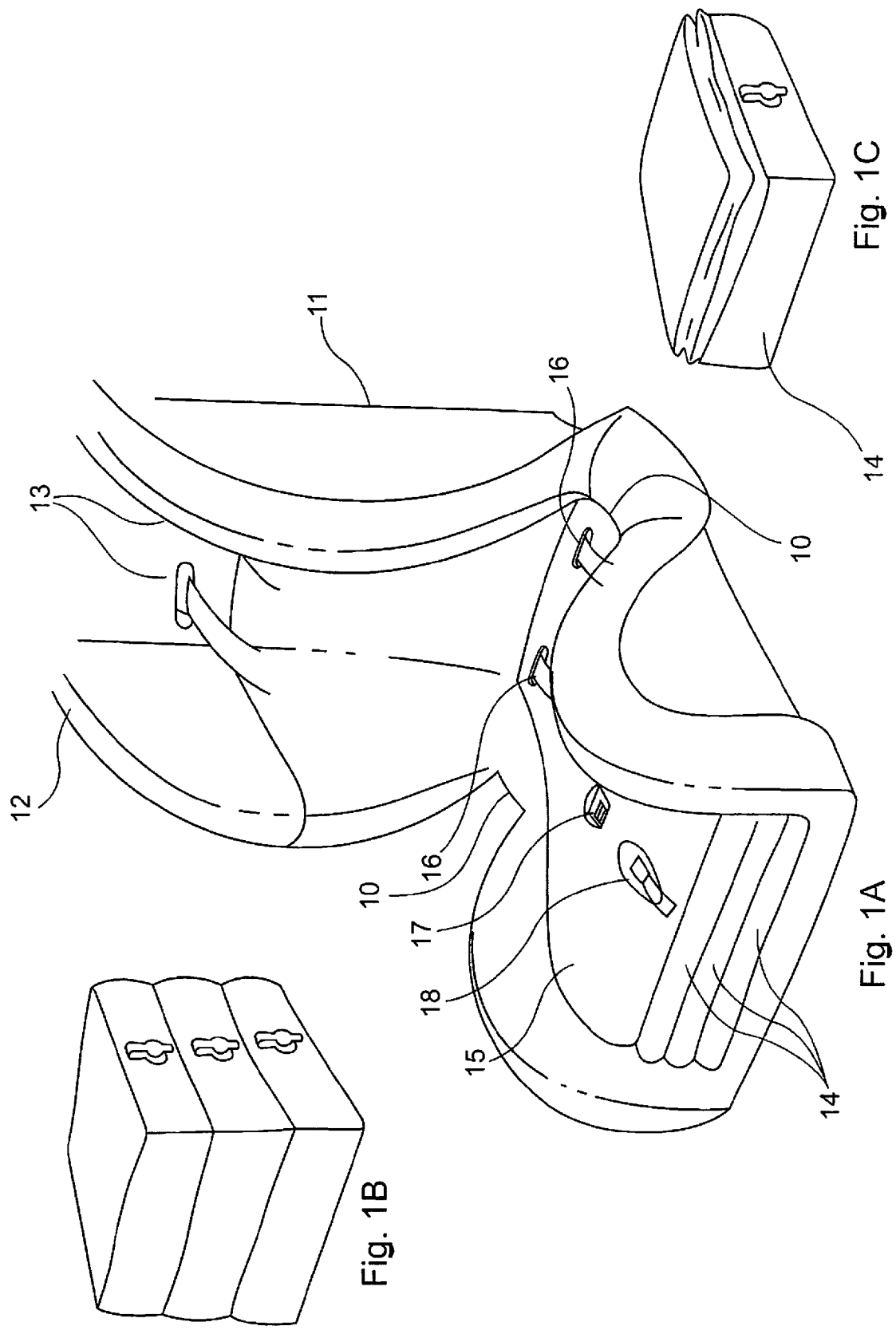

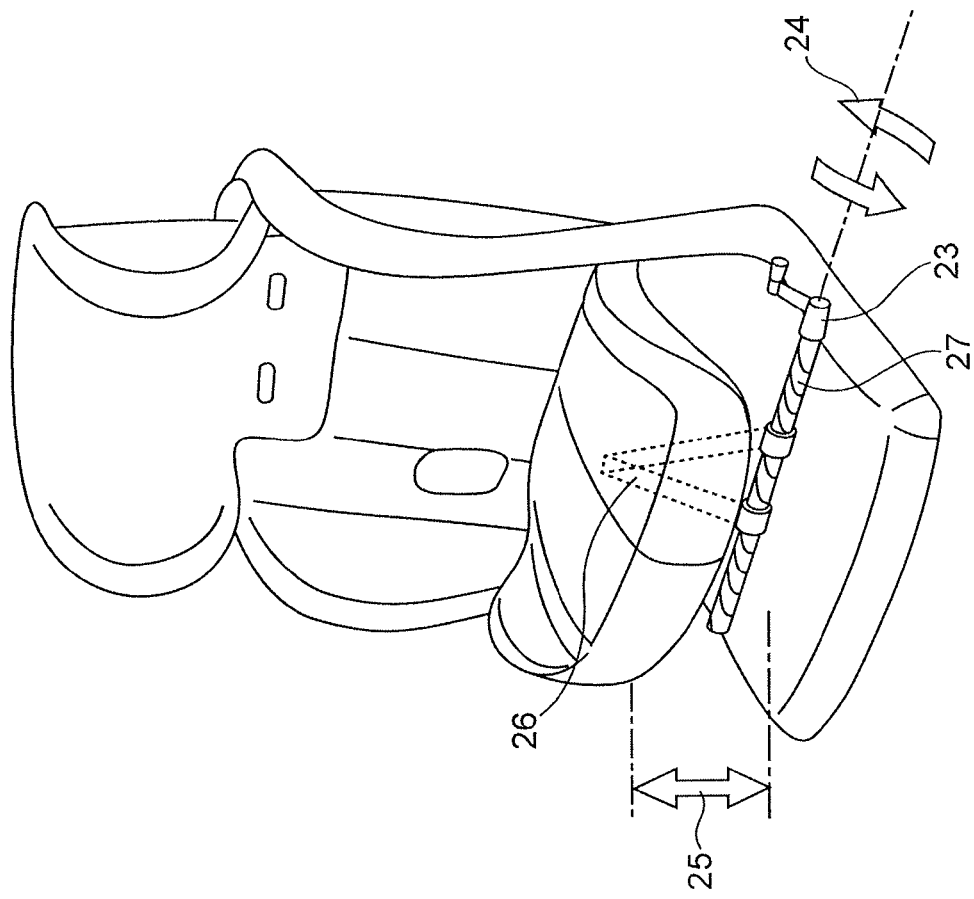
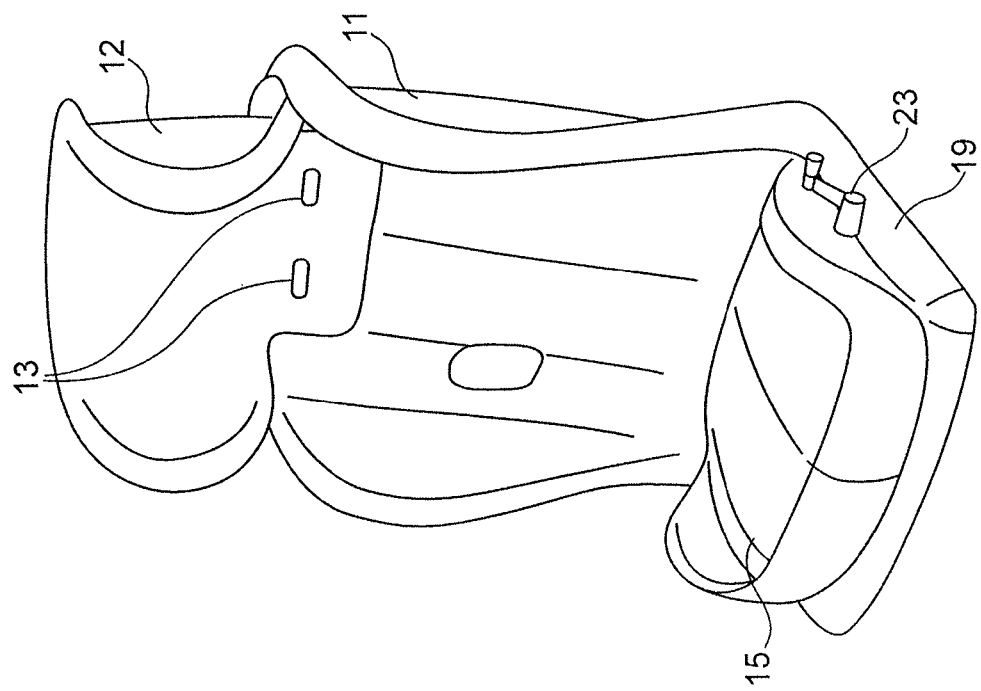

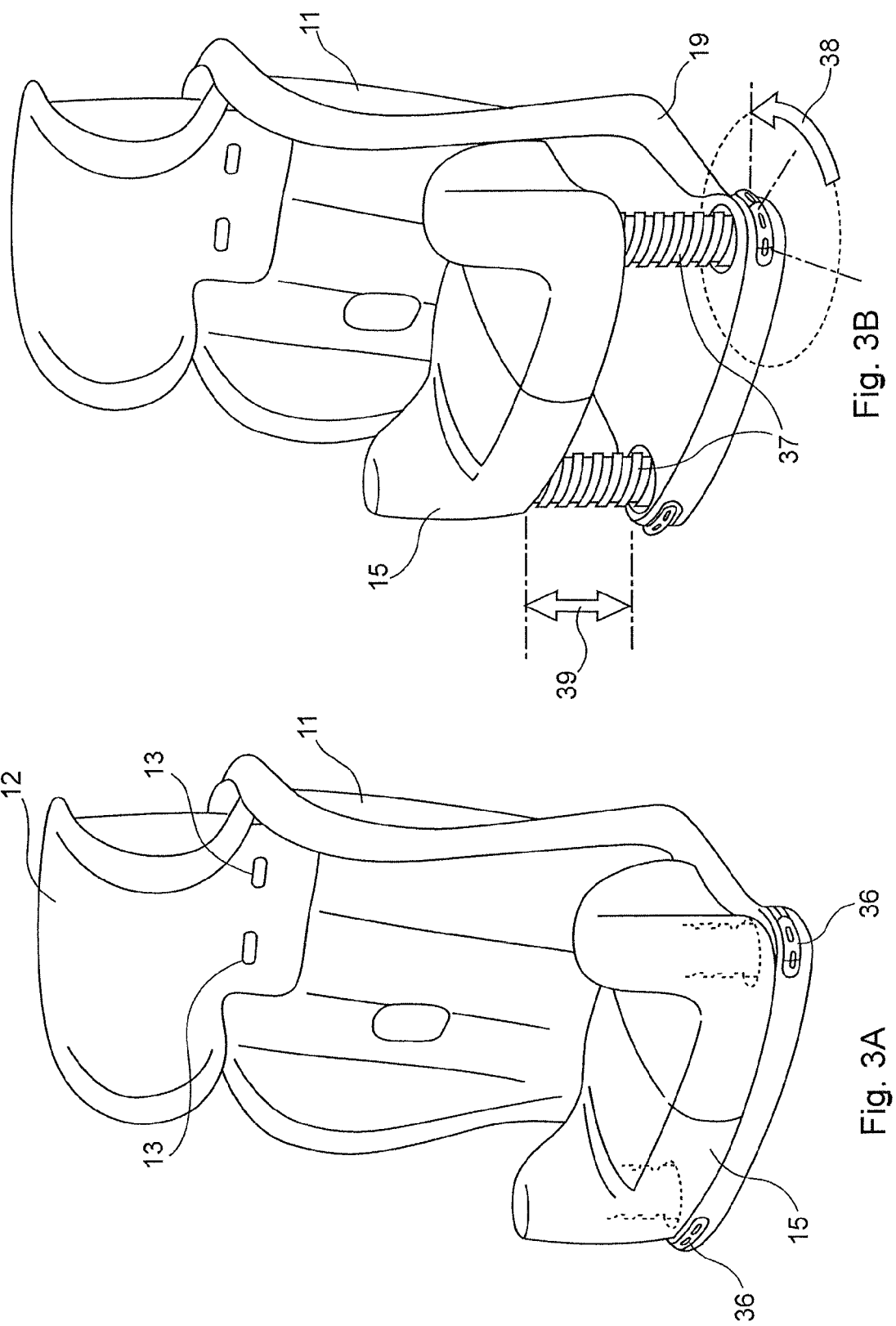

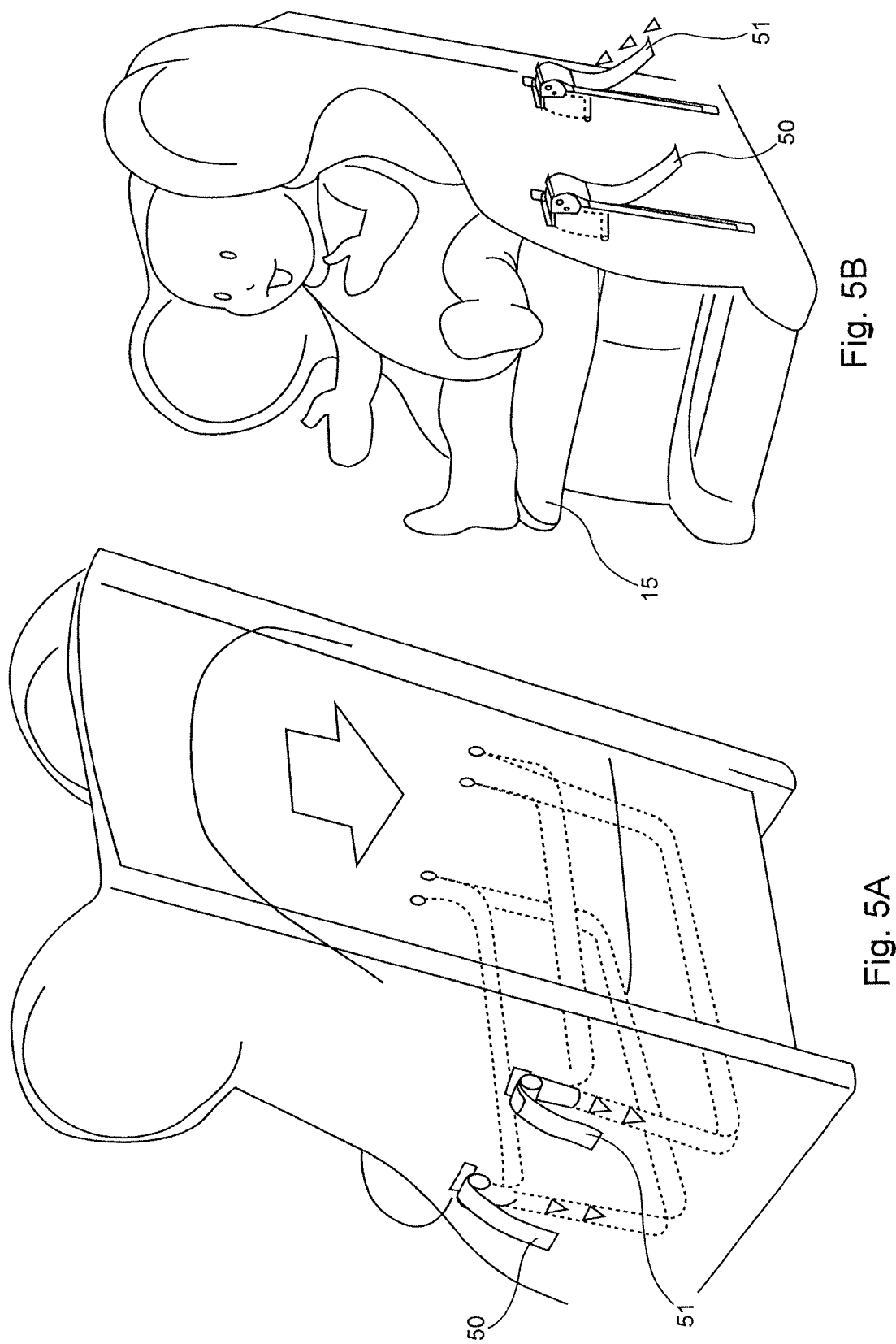

CHILD CAR SEAT WITH HEIGHT-ADJUSTABLE SEAT CUSHION

CROSS REFERENCE TO RELATED APPLICATIONS

This application is a U.S. nationalization under 35 U.S.C. §371 of International Application No. PCT/EP2013/070859, filed Oct. 7, 2013, which claims priority to French Application No. 1259576, filed Oct. 8, 2012 and to French Application No. 1353301, filed Apr. 11, 2013.

The field of the invention is that of child care. More precisely, the invention relates to automobile seats for children which are intended to be installed on the passenger seats of vehicles. It relates, in particular, to automobile seats adapted to receive children of variable sizes and or weights, and able to change in order to take into account the development of a child over several months or years. As such, the invention is applied to adjustable automobile seats.

The invention applies primarily to Group 1 automobile seats, for children whose weight is between and 18 kg, as well as, in certain embodiments, to Groups 1/2/3 automobile seats, allowing the automobile seat of the group 1 category, for children whose weight is between 9 and 18 kg, to change to the group 2/3 category for children whose weight is between 15 and 36 kg.

Group 1/2/3 automobile seats adapted to both small and large children, i.e. changeable, are known. These automobile seats must be adapted to different types of restraint, namely a harness with shoulder straps integral with the automobile seat for the smallest children (Group 1) and, starting from the age of three years, the use of the three-point seat belt of the car to attach the child (Group 2/3).

The invention relates in particular to the optimisation of the implementation of this harness with shoulder straps (most often a five-point harness).

Automobile seats are generally adjustable, in order to adapt to the size and to the morphology of the child. In particular, in order to provide for the safety of the child, as well as his or her comfort, it is suitable, in the case of a harness with shoulder straps, for the upper portion of the harness to be placed in a precise manner on the shoulders of the child. For this, the seatback of the automobile seat integrates mechanisms for adjusting the harness in height. Most often, such an automobile seat further comprises a headrest that can also be adjusted in height. The top fastening points of the harness can as such have several positions, according to the size of the child.

Recall that in the expression "harness with shoulder straps", the term "shoulder straps" encompasses the straps forming shoulder straps (also called in what follows "top straps") and the straps forming a belt (also called in what follows "lateral straps"). The harness is therefore a five-point harness, since it comprises two shoulder straps, each fixed at two points of the automobile seat 1, which is four fastening points, and a crotch piece (also called in what follows "low strap" of the harness), fixed at one point of the automobile seat.

Two main solutions are known to date to allow for such an adjustment in height of the harness.

According to a first solution, several series of slots are provided in the seatback of the seat (for example three), located at separate heights of the seatback of the automobile seat, allowing for the passage of the top straps of the harness. According to the age and to the size of the child, the user of the automobile seat (for example the parent), chooses the series of slots wherein it is suitable to place the top straps of the harness so that they are positioned as best as possible in relation to the shoulders of the child.

However, this adjusting is relatively tedious, and requires having access to the rear of the seatback of the automobile seat. Furthermore, there is a risk of incorrect adjustment ("misuse"), which can negatively affect the safety of the child.

According to a second solution, the adjusting of the height of the harness is accomplished by using a guiding of the strap (via a sliding plate and/or rack).

However, in this case, the seatback must be relatively hollow in order to integrate these mechanisms for adjusting the height of the harness. This results in a weakening of the overall structure of the seat, which is necessary to offset with lateral reinforcements which increase the weight of the automobile seat.

The invention has in particular for objective to overcome these disadvantages.

More precisely, an objective of the invention is to provide an automobile seat that provides a more effective and safer maintaining of a child, in particular in the event of impact or deceleration.

In particular, an objective of the invention is to provide such an automobile seat, providing a more effective positioning of the harness with shoulder straps.

These objectives, as well as others that shall appear more clearly in what follows are achieved using an automobile seat for a child, comprising a seat base that can be adjusted in height between at least two positions, in such a way as to place the child in an appropriate position in relation to a harness placed in said automobile seat and intended to maintain the child in said seat. Such a seat further comprises a seatback bearing elements for guiding top straps of the harness, with such elements for guiding being fixed in relation to the seatback.

As such, the harness is always optimally placed, since the position of the head and of the shoulders of the child in relation to the upper portion of the harness does not change. The head and the shoulders of the child are as such placed correctly, regardless of the size of the child, by displacing the seat base in height.

Note that, according to the invention, such an automobile seat can also include a seatback, a headrest, as well as lateral protection intended to protect the thorax of the child in the event of impact. Thanks to the adjustment in height of the seat base of the seat, such protective elements (headrest and lateral protection) are always well placed in relation to the head and to the thorax of the child, which increases his or her safety in the event of impact or substantial deceleration.

Furthermore, such an adjustment in height of the seat base allows a small child to be seated higher in relation to the vehicle, which offers him or her better visibility, a better outside view, and therefore better comfort.

Likewise, adjusting the seat base in height makes it possible to avoid having to adjust the height of the harness.

As such, the harness remains fixed in its top portion (i.e. the position of the top straps of the harness is fixed in relation to the seatback). The safety of the automobile seat can as such be increased, by providing a more rigid rear seatback, as it is no longer necessary for it to house a mechanism for adjusting the height of the harness. Furthermore, in automobile seats that integrate such a mechanism for adjusting the height of the harness, the weakening of the structure of the seat caused by the presence of a "hole" in the seatback is generally offset by lateral reinforcements, which make the seat heavier. According to the invention, the adjusting in height of the seat base, which suppresses this "hole" in the seatback, therefore makes it possible to distribute the forces better and to obtain a lighter automobile seat.

It is also no longer necessary to arrange in the seatback several series of slots allowing for the passage of the top straps of the harness, from among which the user must choose the one of which the height is the best suited to the size of the child. The risks of incorrect use ("misuse") or of an incorrect installation of the harness are as such reduced.

Furthermore, such an adjusting in height of the seat base also makes it possible to avoid having to adjust the headrest in height.

According to a particular embodiment, such a seat can also be provided with fastening clamps, allowing the seat to be hooked to hooking loops provided for this purpose in the vehicle.

In an embodiment of the invention, the seat base bears elements for guiding the lateral straps of said harness.

As such, when the seat base is displaced in height, the fastening points of the lateral straps of the harness are also displaced. The user therefore only has to tighten the harness, after having installed the child in the seat, by exerting tension on the adjustment point of the low strap of the harness, in a conventional manner.

In another embodiment of the invention, the seatback bears elements for guiding lateral straps of the harness, and the seat base bears means for accompanying the displacement of these lateral straps.

As such, the top and lateral straps of the harness are fastened to the seatback, and the low strap of the harness is fastened to the seat base of the seat. In order to prevent any incorrect positioning of the lateral straps of the harness during the displacement in height of the seat base, means are advantageously provided on the seat base itself for accompanying the displacement of these lateral straps, in order to prevent them in particular for example from being pinched between the seatback and the seat base during the displacement in height of the latter.

For example, recesses 10 are provided on the rear portion of the seat base, in contact with the seatback, wherein the lateral straps can easily slide when the seat base is displaced in height, without risking being trapped between the seatback and the seat base.

According to another aspect of the invention, the depth of the seat base can be adjusted. In this way, the seat base can be adapted to the size of the child, and in particular to the length of the legs of the latter.

In this case, the adjustments of the height and of the depth of the seat base can be linked.

According to another aspect of the invention, the inclination of the seat base can be adjusted, and the adjustments of the height and of the inclination of said seat base are linked.

In this way, the safety of the child is improved, since for a small child, for whom the seat base is going to be adjusted to the top position, the latter will also be inclined towards the rear, which will provide a better maintaining of the child, in the event of impact or deceleration.

According to the embodiments, said adjustments implement at least one of the elements belonging to the group comprising connecting rods, cams, worm screws.

According to a particular embodiment of the invention, the adjusting of the height of the seat base implements at least two cams or two connecting rods located respectively at the front and at the rear of said seat base, and the amplitude of the rear connecting rod or of the cam is less than that of the front connecting rod or of the cam, in such a way that the raising of the seat base drives its inclination towards the rear.

Other characteristics and advantages of the invention shall appear more clearly when reading the following description of embodiments of the invention, provided for the purposes of information and in a non-restricted manner and accompanied by drawings, among which:

FIGS. 1A to 1C show a first example of a pneumatic mechanism for adjusting the height of the seat base;

FIGS. 2A and 2B show a second example of adjusting the height of the seat base implementing a compass and a worm screw;

FIGS. 3A and 3B show an alternative embodiment of the adjusting in height of the seat base based on screws of which the rotation makes it possible to raise the front portion of the seat base;

FIGS. 5A and 5B show another alternative wherein the height of the seat base can be adjusted by means of straps;

Figure 6:
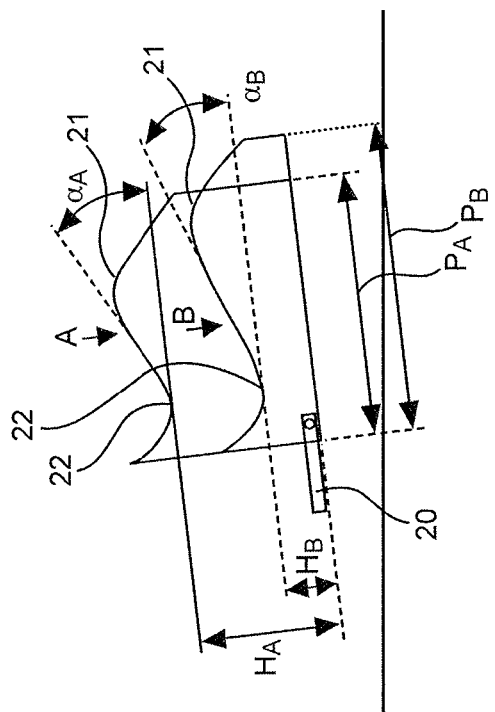
FIG. 6 shows, diagrammatically, the principle of the modification of the inclination and of the depth of the seat base correlated with the adjustment in height of the seat base.

The invention therefore proposes a new type of automobile seat for children, providing an effective and safe positioning of the harness, regardless of the size of the child.

For this, as can be seen in FIGS. 1A to 1C showing a first embodiment of the invention, the seatback 11 of the seat is provided with a headrest 12 and elements for guiding 13 the top straps of the harness fixed in relation to the seatback.

These strap-guides 13 were designed and placed on the seatback 11 in an optimal position in order to provide a good positioning of the five-point fastening harness in relation to the shoulders of the child.

As such, regardless of the size of the child, the head and the shoulders of the latter are always in the same position, in relation to the top of the seatback, and therefore in relation to the strap guides 13. For this, the seat base 15 can be adjusted in height, in such a way as to adapt the distance between this seat base and the headrest, to the size of the child.

When the child is of small size, the seat base is placed in top position. Inversely, for a child of large size, the seat base 15 is brought downwards.

In the example of FIG. 1A, three air chambers 14 are arranged under the seat base 15 and can be inflated in order to raise the seat base 15. As such, for a child of small size, the three air chambers are inflated, as shown in FIG. 1B, and the seat base 15 is then at its maximum height. For a child of large size, only one air chamber is inflated, as shown in FIG. 1C. An intermediate position of the seat base can be obtained by inflating two of the three air chambers.

In the embodiment shown, the shoulder straps are each fastened at two points 13, 16 of the automobile seat 1, which is four fastening points, and the crotch piece 17 is fastened at one point of the automobile seat, in such a way that the harness is of the five-point harness type. The shoulder straps each include one portion (top strap) intended to maintain the torso of the child and one portion (lateral strap) forming a ventral belt portion. The shoulder straps and the crotch piece 17 (also called low strap) are connected together during the retaining of a child in a buckle of a harness comprising a button for controlling the opening of the harness.

Note that, in FIG. 1A, the elements for guiding 16 the lateral straps of the harness, as well as the fastening point of the crotch piece 17 of the harness are arranged on the seat base 15.

Shoulder straps generally include two shafts (not shown) forming sleeves around the shoulder straps and comprising a fabric having a high coefficient of friction making it possible to retain the child in the event of impact. An end portion 18 of the harness, able to be seen in FIG. 1A, allows a user to adjust the length of the shoulder straps of the harness. In order to reduce the length of the shoulder straps, the user pulls for example on the end portion 18 of the harness and in order to release and increase the length of the shoulder straps, the user presses for example on a button located on the base of the crotch piece 17.

The FIGS. 2A and 2B show another embodiment for the adjusting in height of the seat base 15. The seat base 15 is fastened, in its lower portion, to the upper end of a compass 26. The ends of the two branches of this compass 26 can be displaced along a screw 27, located between the base 19 of the automobile seat and the seat base 15. A crank 23 is placed at the end of the screw 27.

When the crank 23 is rotated 24, the branches of the compass tighten by moving along the screw 27, which drives the displacement 25 in height of the seat base 15. Inversely, when the crank is turned in the opposite direction, the branches of the compass separate again, which causes the seat base 15 to descend again.

Again, the automobile seat has a seatback 11 provided with a headrest 12, wherein are arranged passages 13 for the top straps of the harness. The elements for guiding lateral straps have not been shown, but can be borne by the seat base 15 or by the seatback 11. Likewise, the low fastening point of the harness has not been shown, but it is borne by the seat base 15.

In FIGS. 3A and 3B, the seat base 15 has in its front portion, on each side, a housing making it possible to receive a screw 37. The seat base 15 therefore has a particular shape, wherein the lining of the housings of screws 37 also plays the role of a lateral protective element for the child. By actuating 38 thumbwheels 36 located on the base 19 of the automobile seat, the raising 39 of the seat base 15 is caused, with the screws 37 cooperating with the corresponding screws pitches of the screws housings of the seat base. Two thumbwheels 36 were shown in FIGS. 3A and 3B. As an alternative, it could also be provided to fasten the movement of the two screws 37, in such a way as to provide a positioning to the horizontal of the seat base 15, in any position of adjustment.

Figure 4:
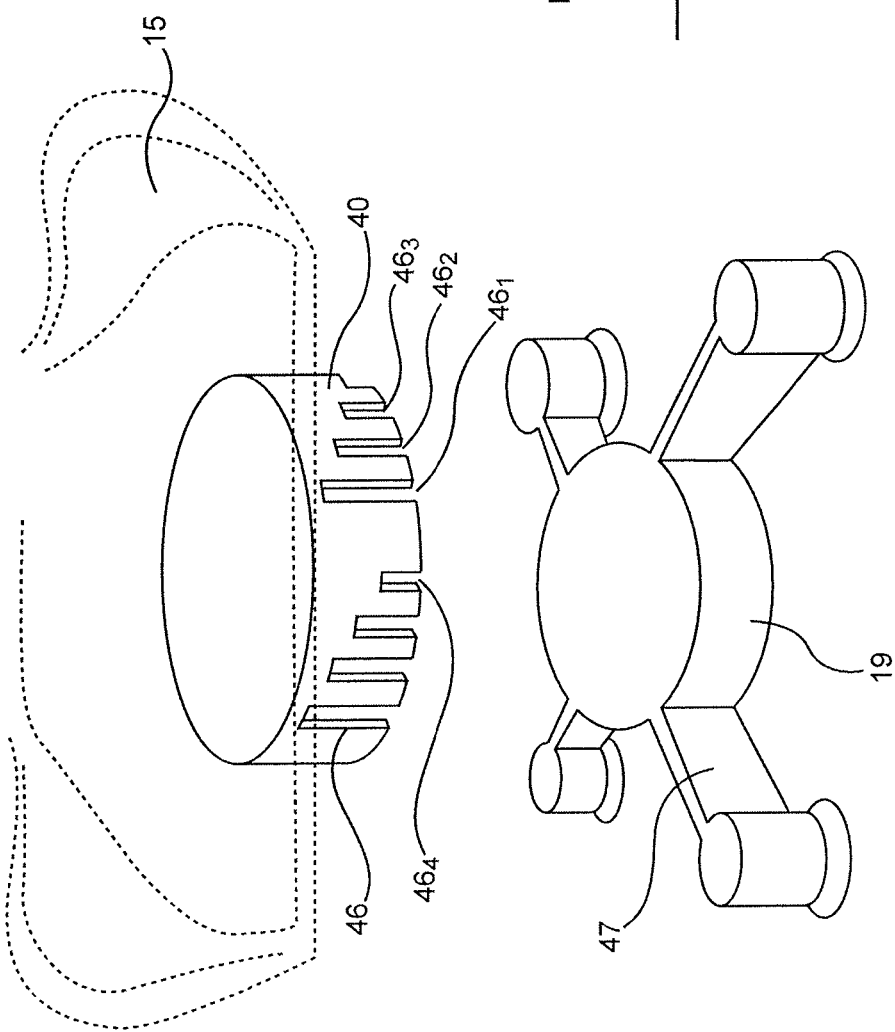
FIG. 4 shows an alternative mechanism for adjusting the height of the seat base based on a drum having a plurality of slots of varied heights.

FIG. 4 shows another embodiment of the mechanism for raising the seat base 15. With a concern for simplification, all of the automobile seat has not been shown, which is similar to that of the other figures.

A drum 40 is positioned under the seat base 15, wherein are arranged four series 46 of slots $46_1$ to $46_4$, of different heights, spaced angularly by about 90°. In the example of FIG. 4, each series 46 of slots comprises four slots of separate heights, in such a way that the seat base 15 can take four different positions in height.

Although not shown in FIG. 4, the drum 40 is mounted under the seat base 15 in such a way as to be able to pivot in relation to the latter.

The base 19 of the automobile seat comprises a central hub around which are connected four arms 47 provided with at their ends stabilizing feet. These four arms are angularly spaced by about 90°.

By rotating the drum 40, which slot $46_1$ to $46_4$ of each series 46 of slots cooperates with each of the arms 47 of the base 19 is chosen: as such, the height of the seat base 15 is adjusted. Indeed, when the four small slots $46_4$ slide on the arms 47, the seat base is in the highest position. Inversely, when the four larger slots $46_1$ slide on the arms 47, the seat base is in the lowest position. The slots of intermediate sizes $46_2$ and $46_3$ make it possible to obtain two other heights of the seat base. Another number of slots in each series could also be provided, in order to obtain more or less adjusting positions of the seat base.

FIGS. 5A and 5B further show another alternative embodiment of the mechanism for adjusting the height of the seat base 15. In this alternative, the seat base 15 is supported by two straps 50 and 51.

The adjusting of the height of the seat base 15 is carried out by playing with the length of the support straps 50 and 51. Openings are made on the lateral flank of the automobile seat, to allow the user access to the support straps 50 and 51, of which the user can adjust the length, in order to adapt the height of the seat base 15.

Furthermore, in all of the alternative embodiments shown in FIGS. 1 to 5, 7 and 8, the seat can be, optionally, provided with Isofix® clamps (unable to be seen in FIGS. 1 to 5, 7 and 8, but shown diagrammatically in FIG. 6, reference 20), which make it possible to maintain the seatback 11 thrust against the seatback of the vehicle.

Likewise on most of the figures described hereinabove, only the top fastening points of the straps of the harness have been shown. As mentioned hereinabove, the fastening points of the lateral straps can be arranged on the seatback or on the seat base. The low fastening point of the harness is arranged on the seat base.

In relation with FIGS. 6 to 8 an embodiment of the invention is now shown wherein the adjusting of the height of the seat base is accompanied by an adjusting of its inclination and/or of its depth.

As can be seen in FIG. 6, the front portion of the seat base forms a more substantial angle with the horizontal in the case where the seat base is in top position.

In this FIG. 6, the upper portion of the seat base is shown diagrammatically, provided with an anti-submarining system 21, respectively in a high position and in a low position of the seat base.

The seat base can then have at least two separate positions in height $H_A$, $H_B$. Several intermediate positions can of course be provided. The adjusting between the two extreme positions can also be continuous.

The seat base therefore has a hollow 22, at the level of the buttocks of the child. Its inclination $\alpha_A$, $\alpha_B$, can also be adjusted.

Moreover, according to a particular embodiment, the depth $P_A$, $P_B$ of the seat base can also be adjusted, to adapt even better to the size of the child.

Although the various adjustments can be independent, an interesting approach is to link them together. As such, the passage from the height $H_A$ to the height $H_B$ automatically drives the passage from the depth $P_A$ to the depth $P_B$ and/or the passage from the inclination $\alpha_A$ to the inclination $\alpha_B$.

These various displacements can be controlled by a manual action, for example using a crank or a button. In other embodiments, these displacements can be motorised.

They can for example implement connecting rods, cams, worm screws, racks, gears, etc.

Figure 7B:
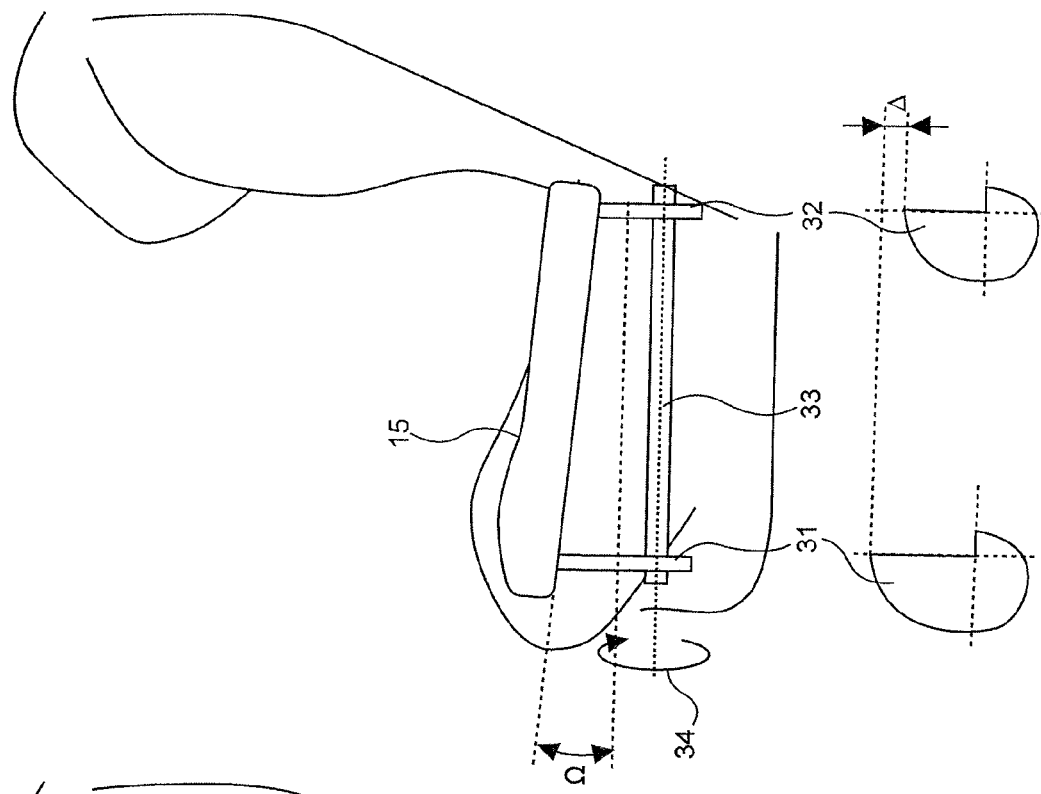
FIGS. 7A and 7B show a first example of a mechanism for raising the seat base based on cams that jointly drive a modification of its inclination.
Figure 7A:
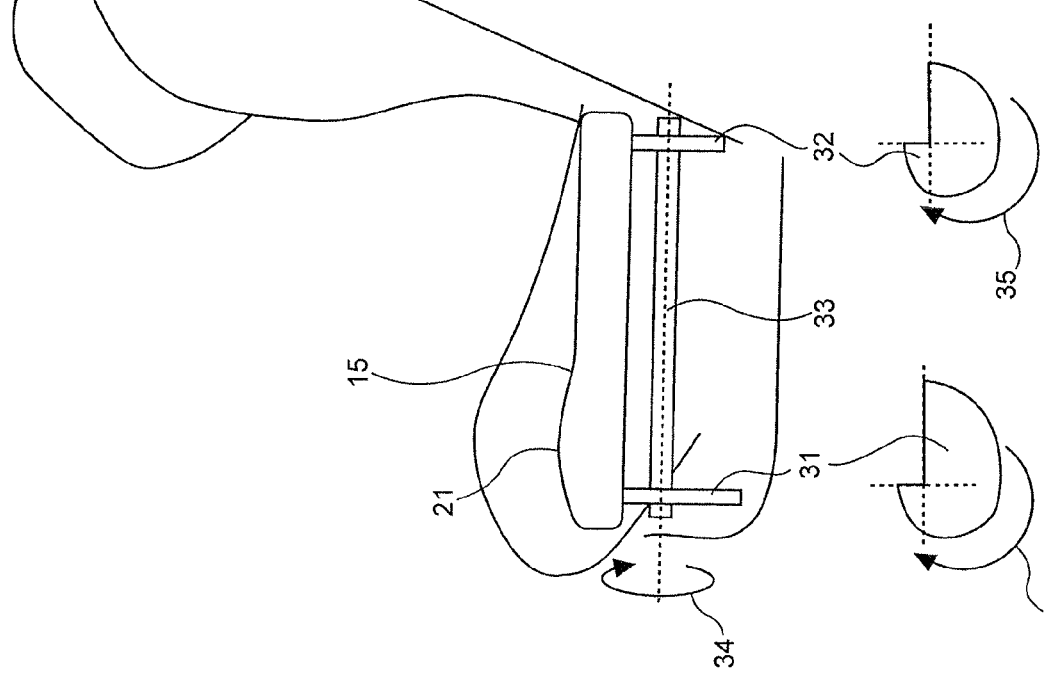

In relation with FIGS. 7A and 7B, a first example of a mechanism for raising the seat base of the automobile seat according to the invention, based on cams, shall now be shown.

The seat base 15, having an anti-submarining system 21 (optional), is mounted on two cams, one front cam 31 and one rear cam 32. These two cams 31, 32 are fastened to the same axis 33, able to be driven in rotation (arrow 34), for example by means of a manual manipulation of a crank or of a button, not shown in the figure. The rotation 34 of the axis 33 drives the rotation 35 of the cams 31 and 32, which causes the raising of the seat base 15.

Furthermore, it can be advantageously provided that the front cam 31 be of a greater amplitude than the rear cam 32, in such a way that, in addition to the raising of the seat base 15, the rotation 35 of the cams 31, 32 also drives its inclination $\Omega$, due to the difference in amplitude $\Delta$ between the two cams. As an alternative, the two front 31 and rear 32 cams are of the same amplitude, in such a way that their rotation drives the adjusting of the height of the seat base, but not its inclination, which remains unchanged.

Note that the displacement of the cams 31, 32 is continuous during the rotation of the axis 33, in such a way that the inclination $\Omega$ changes progressively, as the seat base 15 is raised.

FIG. 7A therefore shows a first low position of the seat base 15, adapted to a child of large size, wherein the inclination of the seat base is substantially zero.

FIG. 7B shows a second top position of the seat base 15, adapted to a child of small size, wherein the inclination of the seat base is of value $\Omega$.

Figure 8B:
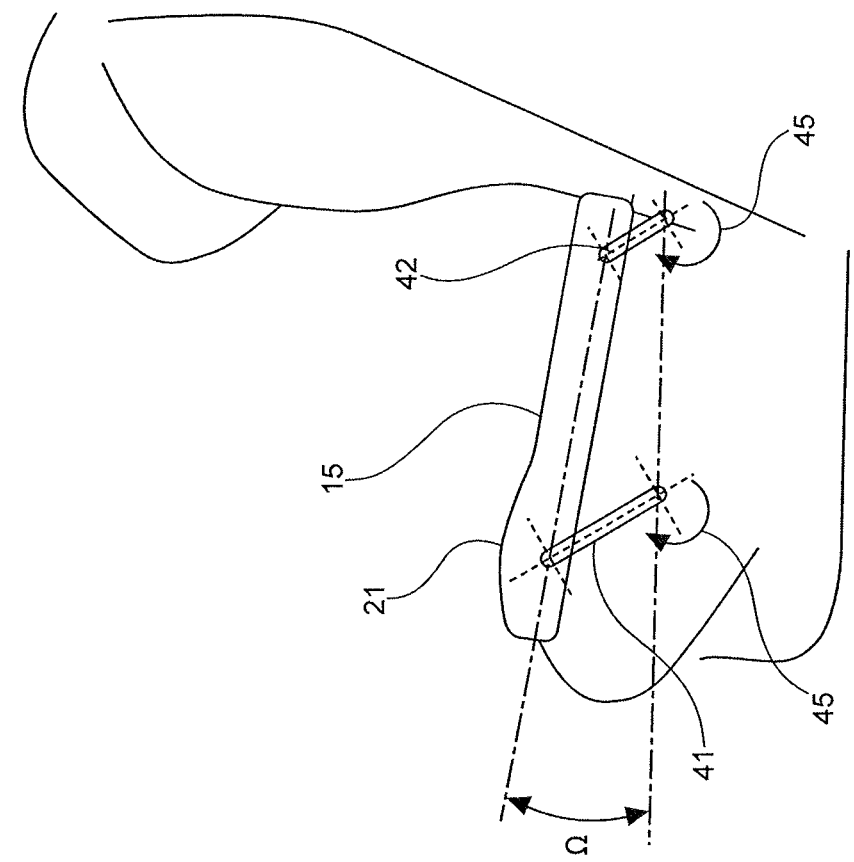
FIGS. 8A and 8B show a second example of a mechanism for raising the seat base based on connecting rods that jointly drive a modification in its inclination.
Figure 8A:
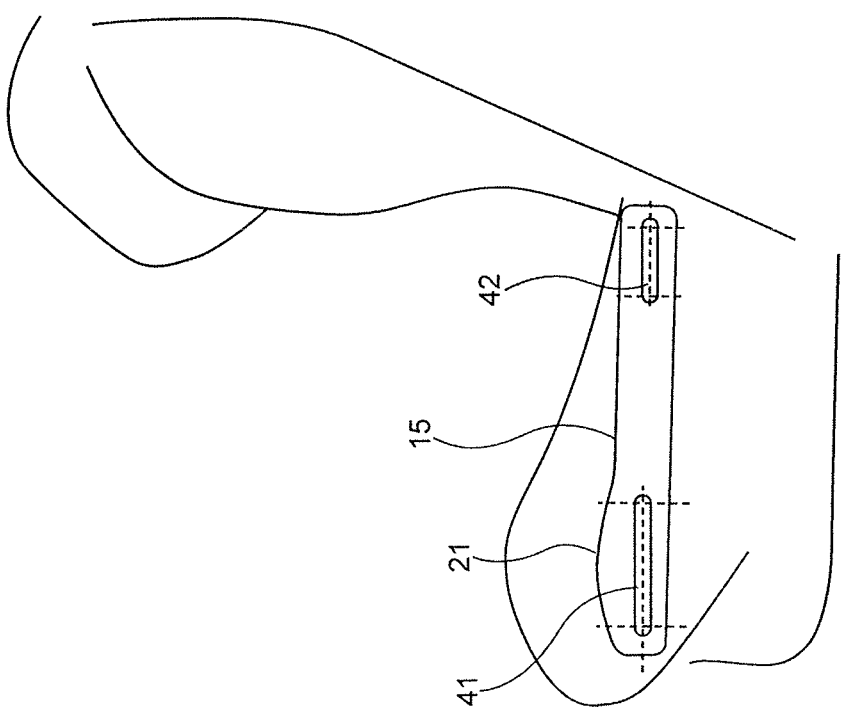

The FIGS. 8A and 8B show another embodiment, wherein the raising of the seat base 15 is accomplished by means of connecting rods, namely a front connecting rod 41 located under the front portion of the seat base 15, and a rear connecting rod 42, located under the rear portion of the seat base 15. The front connecting rod 41 is therefore substantially located under the anti-submarining system 21 (optional).

It is provided that the front connecting rod 41 be longer than the rear connecting rod 42. The simultaneous rotation of the connecting rods, symbolised by the arrows 45, causes the raising of the seat base 15. Jointly, the difference in length between the connecting rods 41 and 42 causes the inclination $\Omega$ of the seat base 15.

As such, the anti-submarining system 21 (optional) is placed in an adapted manner, according to the morphology of the child transported.

FIG. 8A therefore shows a first low position of the seat base 15, adapted to a child of large size, wherein the inclination of the seat base is substantially zero.

FIG. 8B shows a second top position of the seat base 15, adapted to a child of small size, wherein the inclination of the seat base is of value Q.

As in the example of FIG. 6, the mechanisms of FIGS. 7A-7B and 8A-8B are therefore designed in such a way that the passage of the seat base 15 from a height $H_A$ to a height $H_B$ automatically drives the passage from an inclination $\alpha_A$ to an inclination $\alpha_B$.

As an alternative, the connecting rods 41 and 42 can be provided of identical size, in such a way that the inclination of the seat base is not modified when its height is adjusted. A mechanism for adjusting the inclination of the seat base can be provided, that makes it possible in particular to lay the child down when he or she is sleeping, independently of the adjustment of the height of the seat base.

As shown by all of the embodiments described hereinabove, the adjusting in height of the seat base makes it possible to suppress the adjusting of the harness in height (the harness is fixed at its upper portion). The rear seatback is as such more rigid since it is no longer necessary for it to include a housing for the mechanism for adjusting the harness in height). Furthermore, the adjusting in height of the headrest can be avoided, with the relative position of the head and of the shoulders of the child remaining unchanged during the adjusting of the height of the seat base.

The invention claimed is:

1. Automobile s Automobile seat for a child, comprising a seat base,
   characterised in that said seat base can be adjusted in height between at least two positions, in such a way as to place the child in an appropriate position in relation to a harness placed in said automobile seat and intended to maintain the child in said seat,
   and in that said seat comprises a seatback bearing means for guiding top straps of said harness, said means for guiding being fixed in relation to said seatback so that the distance between the top straps and the seat base changes during adjustment of the height of the seat base,
   characterised in that the inclination of said seat base can be adjusted, and in that the adjustments of the height and of the inclination of said seat base are linked, and
   characterised in that the adjusting of the height of the seat base implements at least two connecting rods located respectively at the front and at the rear of said seat base, and in that an amplitude of the rear connecting rod is less than that of the front connecting rod in such a way that the raising of the seat base drives its inclination towards the rear.

2. Automobile seat according to claim 1, characterised in that said seat base bears means for guiding lateral straps of said harness.

3. Automobile seat according to claim 1, characterised in that said seatback bears means for guiding lateral straps of said harness, and in that said seat base bears means for accompanying the displacement of said lateral straps in order to prevent said lateral straps from being pinched between the seatback and the seat base during displacement in height of the seat base.

4. Automobile seat according to claim 1, characterised in that said seat is provided with fastening clamps to hook said seat to hooking loops provided for this purpose in the vehicle.

5. Automobile seat according to claim 4, characterised in that said seat base bears means for guiding lateral straps of said harness.

6. Automobile seat according to claim 4, characterised in that said seatback bears means for guiding lateral straps of said harness, and in that said seat base bears means for accompanying the displacement of said lateral straps in order to prevent said lateral straps from being pinched between the seatback and the seat base during displacement in height of the seat base.

7. Automobile seat according to claim 1, characterised in that a depth ($P_A$, $P_B$) of said seat base can be adjusted.

8. Automobile seat according to claim 7, characterised in that adjustments of a height ($H_A$, $H_B$) and of the depth ($P_A$, $P_B$) of said seat base are linked.

9. A juvenile vehicle seat comprising
a foundation adapted to rest in a stationary position on a passenger seat of a vehicle,
a child restraint associated with the foundation and configured to include a seatback arranged to extend upwardly from a rear portion of the foundation and formed to include laterally spaced apart first and second upper belt-receiving slots,
a seat bottom arranged to lie above the foundation and cooperate with the seatback to support a juvenile in a seated position above the foundation, the seat bottom being formed to include laterally spaced-apart first and second lower belt-receiving slots, and
a child-restraint harness coupled to the seat bottom and to the seatback and configured to restrain a juvenile in the seated position on the seat bottom and seatback, the child-restraint harness comprising a first belt arranged to pass through the first lower belt-receiving slot and the first upper belt-receiving slot to lie along a first side of the child restraint and a second belt arranged to pass through the second lower belt-receiving slot and the second upper belt-receiving slot to lie along a second side of the child restraint, and bottom-mover means for moving the seat bottom in one of an upward direction along the seatback away from the foundation to raise the seat bottom to a higher elevation above the foundation to lie closer to the first and second upper belt-receiving slots formed in the seatback while allowing movement of the first belt in the child-restraint harness in the first lower belt-receiving slot and movement of the second belt in the child-restraint harness in the second lower belt-receiving slot during movement of the seat bottom relative to the foundation and in a downward direction along the seatback toward the foundation to a lower elevation to lie closer to the foundation and further away from the first and second upper belt-receiving slots formed in the seatback while allowing movement of the first belt in the child-restraint harness in the first lower belt-receiving slot and movement of the second belt in the child-restraint harness in the second lower belt-receiving slot.

10. The juvenile vehicle seat of claim 9, wherein the bottom-mover means comprises a pneumatic mechanism positioned to lie between the foundation and the seat bottom and configured to be inflated to move the seat bottom upwardly along the seatback away from the foundation and deflated to lower the seat bottom downwardly along the seatback toward the foundation.

11. The juvenile vehicle seat of claim 9, wherein the bottom-mover means comprises a screw rotatable about a horizontal axis of rotation and a compass comprising a first branch coupled at an upper end thereof to the screw and a second branch coupled at an upper end thereof to the seat bottom and a lower end thereof to the screw, and wherein rotation of the screw in a first direction about the horizontal axis of rotation moves the lower branches of the compass toward one another along the screw to move the seat bottom upwardly away from the foundation and rotation of the screw in an opposite second direction about the horizontal axis of rotation moves the lower branches of the compass away from one another along the screw to move the seat bottom downwardly toward the foundation.

12. The juvenile vehicle seat of claim 9, wherein the bottom-mover means comprises a screw arranged to rotate about a vertical axis of rotation and to have a lower end mated to the base and an upper end mated to the seat bottom and a thumbwheel coupled to the foundation and to the lower end of the screw to provide means for rotating the screw in a first direction about the vertical axis of rotation to move the seat bottom upwardly away from the foundation and in an opposite second direction about the vertical axis of rotation to move the seat bottom downwardly toward the foundation.

13. The juvenile vehicle seat of claim 9, wherein the bottom-mover means comprises a drum positioned to lie above the foundation and under the seat bottom and formed to include four series of slots of varying heights and a hub positioned to lie on the foundation and under the drum to support four arms spaced angulary apart from one another by about 90 degrees, and the drum is supported for rotation about a vertical axis relative to the underlying hub to cause each series of slots to cooperate with each of the arms to adjust the height of the drum relative to the hub and thus establish the elevation of the seat bottom relative to the underlying foundation.

14. The juvenile vehicle seat of claim 9, wherein the child restraint further includes a first side wall coupled to the foundation and arranged to extend upwardly therefrom along a first side of the seat bottom and a second side wall coupled to the foundation and arranged to extend upwardly therefrom in laterally spaced-apart relation to the first side wall along an opposite second side wall of the seat bottom to locate the seat bottom between the first and second side walls and the bottom-mover means comprises means for using a strap anchored at one end to the second side wall and arranged to lie in a seat-bottom support position under the seat bottom and to extend through a strap-exit slot formed in the first side wall to provide a grippable portion of the strap located outside the seat-bottom-receiving space provided between the first and second side walls and configured to provide means for moving the strap through the strap-exit slot to raise and lower the seat bottom relative to the foundation.

15. The juvenile vehicle seat of claim 9, wherein the bottom-mover means comprises at least two connecting rods located respectively at the front and at the rear of the seat bottom, and in that the amplitude of the rear connecting rod is less than that of the front connecting rod, in such a way that the raising of the seat bottom drives its inclination towards the rear.

16. The juvenile vehicle seat of claim 15, wherein a first of the two connecting rods is located under the front of the seat bottom, a second of the two connecting rods is located under the rear of the seat bottom, and the first of the two connecting rods is relatively longer than the second of the two connecting rods.

17. The juvenile vehicle seat of claim 15, wherein a first of the two connecting rods is located under the front of the seat bottom, a second of the two connecting rods is located under the rear of the seat bottom, and the two connecting rods are arranged to lie in a first plane when the seat bottom arrives at the lower elevation and in spaced-apart parallel planes when the seat bottom is raised to the higher elevation.

\* \* \* \* \*